United States Patent
Sato et al.

[11] Patent Number: 5,949,625
[45] Date of Patent: Sep. 7, 1999

[54] COMBINATION READ/WRITE THIN FILM MAGNETIC HEAD WITH SLANT SURFACES EXTENDING FROM LOWER CORE LAYER PROMINENCE

[75] Inventors: Kiyoshi Sato; Naohiro Ishibashi, both of Niigata-ken, Japan

[73] Assignee: Alps Electric Co., Ltd., Tokyo, Japan

[21] Appl. No.: 08/924,765

[22] Filed: Aug. 27, 1997

[30] Foreign Application Priority Data

Sep. 10, 1996 [JP] Japan ................................. 8-239455
Jul. 7, 1997 [JP] Japan ................................. 9-181535

[51] Int. Cl.⁶ .................... G11B 5/187; G11B 5/39; G11B 5/235; G11B 5/31
[52] U.S. Cl. .................... 360/122; 360/113; 360/120; 360/126
[58] Field of Search .................... 360/119, 120, 360/121, 126, 122, 113

[56] References Cited

U.S. PATENT DOCUMENTS

| | | | |
|---|---|---|---|
| 5,168,409 | 12/1992 | Koyama et al. | 360/113 |
| 5,438,747 | 8/1995 | Krounbi et al. | 360/113 |
| 5,452,164 | 9/1995 | Cole et al. | 360/119 |
| 5,639,509 | 6/1997 | Schemmel | 360/119 |

*Primary Examiner*—Craig A. Renner
*Attorney, Agent, or Firm*—Brinks Hofer Gilson & Lione

[57] ABSTRACT

A combination read/write thin film magnetic head includes an upper-core layer and a lower-core layer sandwiching a gap layer for writing data on a recording medium. The head also includes a magnetoresistive sensor layer for reading data from the recording medium. The magnetoresistive sensor layer is sandwiched by a lower-shielding layer and the lower-core layers, which also serves as an upper shielding layer. Each of the layers is arranged in parallel to one another. The width of the upper-core layer defines the width of a recording track. The width of the gap layer is made equal in length to the width of the upper-core layer to reduce magnetic leakage outside the recording track at the gap layer. The lower-core layer includes a prominence and a lower-core body. The prominence is made narrower to reduce magnetic leakage outside the recording track between the upper-core layer and the prominence. The lower-core body has slanted surfaces extending away from the upper-core layer. The slanted surface reduce magnetic leakage outside the recording track between the upper-core layer and the lower-core body.

40 Claims, 12 Drawing Sheets

B ---- ($\theta 5 = 3°$)
C1 ---- ($\theta 2 = 2°$)
C2 ---- ($\theta 2 = 4°$)
D1 ---- $\begin{pmatrix}\theta 1 = 30°\\ \theta 2 = 2°\end{pmatrix}$
D2 ---- $\begin{pmatrix}\theta 1 = 45°\\ \theta 2 = 2°\end{pmatrix}$
D3 ---- $\begin{pmatrix}\theta 1 = 45°\\ \theta 2 = 5°\end{pmatrix}$
E1 ---- $\begin{pmatrix}H = 0.2\\ \theta 2 = 2°\end{pmatrix}$
E2 ---- $\begin{pmatrix}H = 0.4\\ \theta 2 = 2°\end{pmatrix}$
E3 ---- $\begin{pmatrix}H = 0.4\\ \theta 2 = 5°\end{pmatrix}$

COMBINATION READ/WRITE THIN FILM MAGNETIC HEAD WITH SLANT SURFACES EXTENDING FROM LOWER CORE LAYER PROMINENCE

BACKGROUND OF THE INVENTION

1. Field of the Invention

The present invention relates to combination read/write thin film magnetic heads used in floating-type magnetic heads and the like. In particular, the present invention relates to a combination read/write thin film magnetic head and a method for making the same, in which the track width of a magnetic gap of an inductive thin film magnetic head is highly precisely formed in order to reduce occurrence of write fringing.

2. Description of the Related Art

FIG. 14 is a longitudinal sectional-view of a conventional combination read/write thin film magnetic head, and FIG. 15 is a section facing a recording medium of the magnetic head shown in FIG. 14 and a fragmentary front view along arrow XV in FIG. 14. The magnetic head shown in FIGS. 14 and 15 is an inductive magnetic head which writes signals on a recording medium such as a hard disk. The inductive magnetic head is superposed with a reading head which uses the magnetoresistance effect at the trailing edge of the slider of a floating-type magnetic head which faces a recording medium such as a hard disk.

Identification number 11 in FIG. 14 represents a lower-core layer composed of a high magnetic permeability material such as a Fe-Ni alloy (permalloy). In a combination read/write thin film magnetic head in which an inductive head shown in FIG. 14 is continuously superposed with a reading head which uses the magnetoresistance effect, the lower-core layer 11 acts as an upper-shielding layer of the reading head.

A gap layer 12 composed of a nonmagnetic material such as $Al_2O_3$ (aluminum oxide) is provided on the lower-core layer 11. An insulating layer 4 composed of an organic material, such as a resist material, is formed on the gap layer 12.

A coil layer 5 composed of an electrically conductive material having a low electric resistance, such as Cu, is spirally formed on the insulating layer 4. Herein, the coil layer 5 is formed so as to surround the periphery of the base end 7b of the upper-core layer 7, and a part of the coil layer 5 is shown in FIG. 14.

An insulating layer 6 composed of an organic resinous material is formed on the coil layer 5. An upper-core layer 7 composed of a magnetic material such as permalloy is formed by plating on the insulating layer 6. The front end 7a, facing the recording medium, of the upper-core layer 7 is jointed to the lower-core layer 11 through the gap layer 12. The base end 7b of the upper-core layer 7 is magnetically connected to the lower-core layer 11 through the holes formed in the gap layer 12 and the insulating layer 4.

In the inductive writing head, a recording current circulating in the coil layer 5 induces a recording magnetic field in the lower-core layer 11 and the upper-core layer 7, and magnetic signals are recorded on a recording medium such as a hard disk by means of a leakage magnetic field from the magnetic gap between the lower-core layer 11 and the front end 7a of the upper-core layer 7.

In the magnetic gap for the inductive writing head, the gap length Gl is determined by the distance between the lower-core layer 11 and the front end 7a of the upper-core layer 7 which are jointed through the gap layer 12, i.e., the thickness of the gap layer 12, and the gap depth Gd is determined by the depth at the front end 7a of the upper-core layer 7. Further, the track width Tw is determined by a width of the front end 7a of the upper-core layer 7, as shown in FIG. 15.

As shown in FIG. 15, the width T3 of the lower-core layer 11 is sufficiently larger than the width of the front end 7a of the upper-core layer 7, because the lower-core layer 11 has magnetic shield effects to a magnetoresistive element 13 which is formed below the inductive head. That is, in a reading head which uses the magnetoresistance effect as shown in FIG. 15, the magnetoresistive element 13 is provided on a lower-shielding layer 14 through the lower-gap layer 15a and the lower-core layer 11 is formed on the magnetoresistive element 13 through the upper-gap layer. The lower-core layer 11 also acts as the upper-shielding layer to the magnetoresistive element 13. The width T3 of the lower-core layer 11 therefore is sufficiently larger than the width of the magnetoresistive element 13 in order to achieve the function as the upper-shielding layer.

As shown in FIG. 15, a width T3 of the lower-core layer 11 larger than the width Tw of the front end 7a of the upper-core layer 7 induces a recording magnetic field in the lower-core layer 11 and the upper-core layer 7, and a leakage magnetic field formed between the front end 7a and the lower-core layer 11 leaks out of the track width Tw. A leakage magnetic field is also formed beside both sides of the track width Tw due to a large width of the lower-core layer 11.

As a result, the magnetic signals formed on the recording surface of a recording medium such as a hard disk has write fringing or writing blot of magnetic signals which is formed out of the given width Tw of the recording track. The write fringing inhibits high precision detection of the track position in the written recording medium and results in tracking servo errors. In particular, the write fringing significantly affects high density recording with a narrow track pitch.

FIG. 16A is a front view from the recording medium side of an improved head which can suppress the write fringing. In FIG. 16A, after a gap layer 12 is formed on the lower-core layer 11 and a front end 7a of an upper-core layer 7 is formed on the gap layer 12, the lower-core layer 11 and the gap layer 12 are removed by ion milling or the like to form grades 11a and 12a over the lower-core layer 11 and the gap layer 12 at both edges of the front end 7a of the upper-core layer 7. Both of the grades 11a and 12a have an angle $\theta_5$.

Because the grades 12a are simultaneously formed over both ends of the gap layer 12 by the ion-milling process for forming the lower-core layer 11 and the gap layer 12, the width T6 of the face 11b of the lower-core layer 11 facing the front end 7a is larger than the width Tw of the front end 7a. FIG. 16B represents a recording pattern of magnetic data recorded with this head. Since the width T6 of the face 11b is larger than the width Tw, the writing magnetic field leaks out of the track width Tw at the right and left ends to form write fringing.

The head shown in FIG. 16A can reduce write fringing compared to that shown in FIG. 15. A finer track pitch for high density recording will cause some detecting errors due to the write fringing shown in FIG. 16B, and thus the improvement shown in the drawing will be insufficient.

SUMMARY OF THE INVENTION

It is an object of the present invention to provide a combination read/write thin film magnetic head which improves or significantly reduces write fringing, has a simple head configuration, and is capable of ready production.

A combination read/write thin film magnetic head in accordance with the present invention comprises a lower-shielding layer composed of a magnetic material, a nonmagnetic lower-gap layer, a magnetoresistive element and a nonmagnetic upper-gap layer. These layers are layered in this order. The head also comprises a lower-core layer composed of a magnetic material, an upper-core layer composed of a magnetic material, a nonmagnetic gap layer sandwiched by the upper- and lower-core layers, and a coil layer for inducing a recording magnetic field in the lower- and upper-core layers. These layers are provided on the upper-gap layer. The lower-core layer serves as an upper-shielding layer.

The width of the gap layer is equal in length to that of the upper-core layer. The lower-core layer includes a prominence and a lower-core body. The prominence has a top surface and a bottom surface. The width of the prominence at the top surface is equal in length to that of the upper-core layer. The lower-core body has a bottom surface and slanted surfaces extending toward a plane coextensive with the bottom surface of the lower-core body. The gap layer is composed of at least one nonmagnetic material selected from the group consisting of $SiO_2$, $Ta_2O_5$, $Si_3N_4$, TiO and $WO_3$.

The prominence and the lower-core body may be integral or separate layers.

The side surfaces of the prominence may be slanted so that the width of the prominence gradually increases from its top surface toward its bottom surface.

Each of the side surfaces of the prominence may extend at an angle of 60 degrees to 120 degrees with respect to its top surface.

The height of the prominence is preferably not less than the thickness of the gap layer and not greater than three times the thickness of the gap layer.

The slanted surfaces of the lower-core body may extend at an angle of 2 degrees to 10 degrees with respect to the surface of the prominence contacting with the gap layer.

It is another object of the present invention to provide a method for making the above-described combination read/write thin film magnetic head.

DESCRIPTION OF THE PREFERRED EMBODIMENTS

The present invention will now be described with reference to the drawings.

Figure 1:
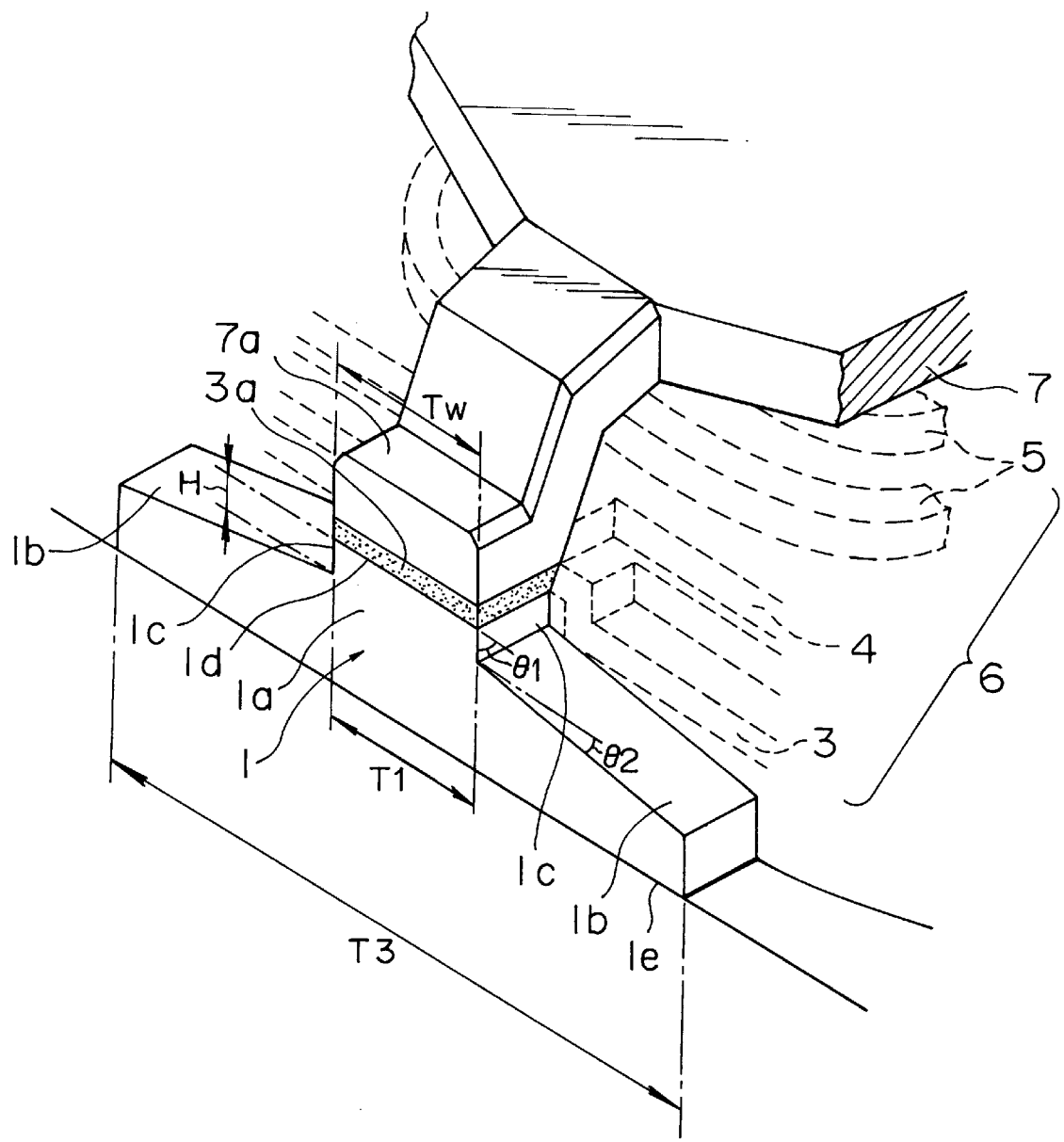
FIG. 1 is a fragmentary isometric view illustrating a structure of a magnetic gap forming section for writing in a combination read/write thin film magnetic head in accordance with a first embodiment of the present invention.
Figure 2:
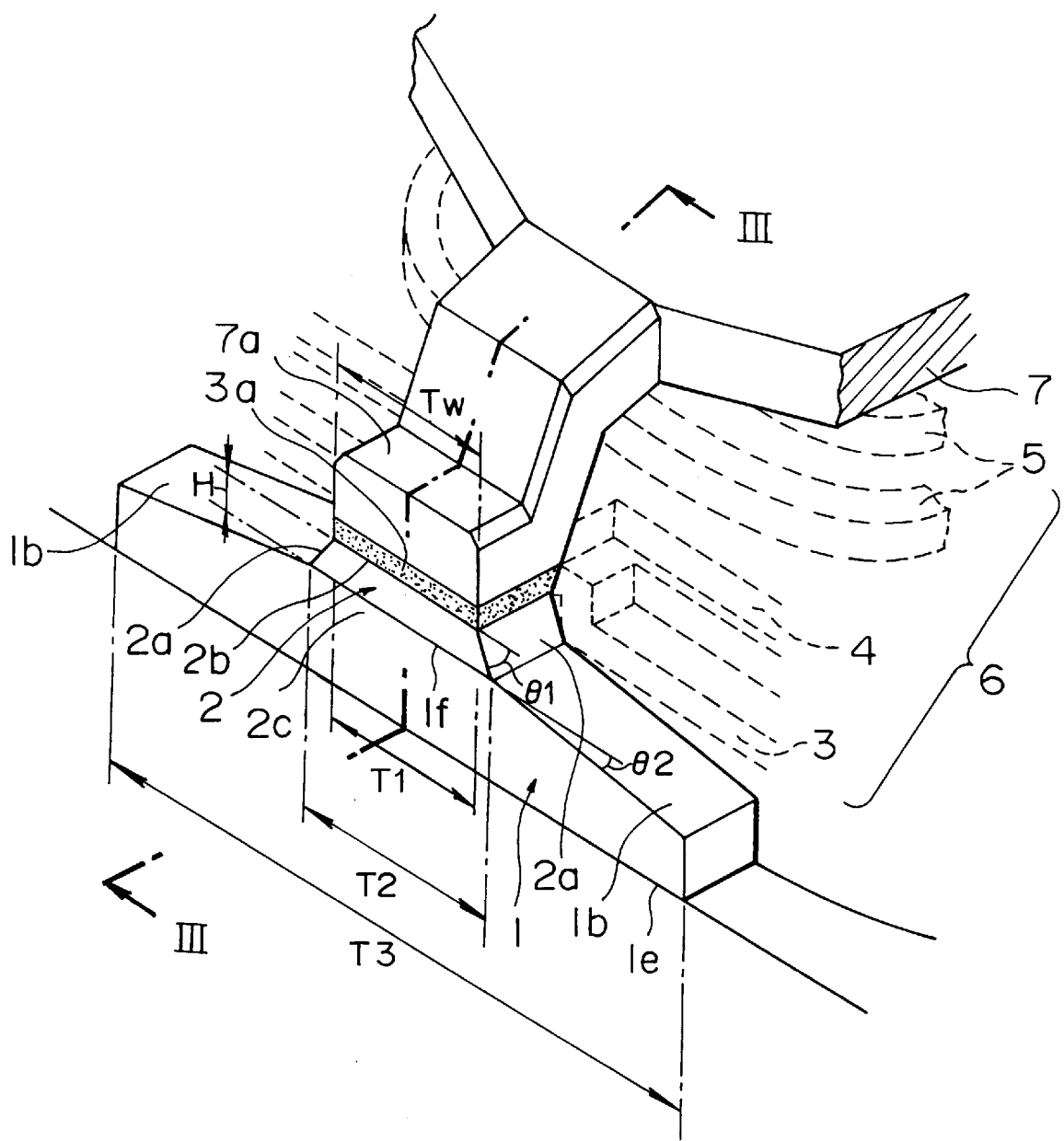
FIG. 2 is a fragmentary isometric view illustrating a structure of a magnetic gap forming section for writing in a combination read/write thin film magnetic head in accordance with a second embodiment of the present invention.

FIG. 1 is a fragmentary isometric view illustrating a structure of a magnetic gap forming section for writing in a combination read/write thin film magnetic head in accordance with a first embodiment of the present invention, and FIG. 2 is a fragmentary isometric view illustrating a structure of a magnetic gap forming section for writing in a combination read/write thin film magnetic head in accordance with a second embodiment of the present invention. The combination read/write thin film magnetic heads shown in FIGS. 1 and 2 are inductive type heads for writing which are overlaid on a reading head which uses the magnetoresistance effect, respectively.

Identification number 1 in FIGS. 1 and 2 represents a lower-core layer formed of a soft magnetic material having a high magnetic permeability, such as an Fe-Ni alloy (permalloy). The combination read/write thin film magnetic heads shown in FIGS. 1 and 2 have the same configuration except for the shapes of the lower-core layers 1.

As in FIG. 15, a magnetoresistive element 13 and a reading head, which is provided with a lower-shielding layer 14 and uses the magnetoresistance effect, are provided below the lower-core layer 1 (11 in FIG. 15) in these embodiments, and the lower-core layer 1 is also used as an upper-shielding layer for the magnetoresistive element 13. The width T3 of the bottom surface 1e of the lower-core layer 1 must be significantly larger than the magnetoresistive element 13 itself in order to satisfactorily achieve the function of the upper-shielding layer. The magnetoresistive element 13 is, for example, a laminate of a soft magnetic layer (or soft adjacent layer: SAL), a nonmagnetic material layer (or a SHUNT layer), and a magnetoresistive layer (or MR layer), and a hard bias layer for generating a longitudinal bias magnetic field, a main lead layer for leading a sensing current and the like are provided beside both sides of the magnetoresistive element 13.

A shape of the lower-core layer 1 of the combination read/write thin film magnetic head will now be described with reference to FIG. 1. The lower-core layer 1 has an integrally formed prominence 1a. The prominence 1a has vertical side faces 1c and a flat gap-facing surface (upper surface) 1d. The prominence 1a has a width T1 which is almost the same as the width Tw of the front end 7a of an upper-core layer 7.

Slanted surfaces 1b are formed on the upper surfaces of the lower-core layer 1 extending from both sides of the base end of the prominence.

The bottom face 1e of the lower-core layer 1 has a width T3, which is significantly larger than the width T1 of the prominence.

A lower-core layer 1 shown in FIG. 2 is also provided with a prominence. In the second embodiment, the lower-core layer 1 forms a first layer, the prominence 2 forms a second layer, and these two layers are superposed. The prominence 2 is also formed of a soft magnetic material as in the lower-core layer 1. The prominence 2 in FIG. 2 has a trapezoidal front view. Both side faces 2a of the prominence 2 therefore slope, and the gap-facing surface (upper surface) 2b is flat. The gap-facing surface 2b has a width T1 which is almost the same as the width Tw of the front end 7a of an upper-core layer 7.

The prominence 2 forms a flat boundary 2c with the lower-core layer (first layer) 1, and the boundary 2c has a width T2 larger than the width T1 of the gap-facing surface 2b of the prominence 2.

The lower-core layer (first layer) 1 also forms a flat boundary 1f having a width T2 with the prominence 2, and has slanted surfaces 1b at both sides of the boundary 1f. The bottom surface 1e of the lower-core layer 1 has a width T3, as described above, which is significantly larger than the width T2 of the boundary 1f or 2c.

Both of the combination read/write thin layer magnetic heads shown in FIGS. 1 and 2 can reduce occurrence of write fringing. The rectangular parallelepiped prominence 1a as shown in FIG. 1 can more effectively reduce write fringing compared to the trapezoidal prominence 2 shown in FIG. 2. In the trapezoidal prominence 2, it is preferable that a tilting angle θ1 between the tilting side face 2a and the gap-facing surface 2b be near 90 degrees, and practically be in a range of 60 degrees to 120 degrees in view of satisfactory suppression of write fringing.

It is preferable that the height H of the prominence 1a or 2 shown in FIGS. 1 and 2 be not less than the thickness of a gap layer 3a and not greater than three times the thickness of the gap layer.

If the height H of the prominence 1a or 2 is smaller than the thickness of the gap layer 3a, leakage magnetic fields will readily be generated between the lower-core layers 1 extending to both sides of the base end of the prominence 1a or 2 and the front end 7a, resulting in noticeable write fringing.

Figure 15:
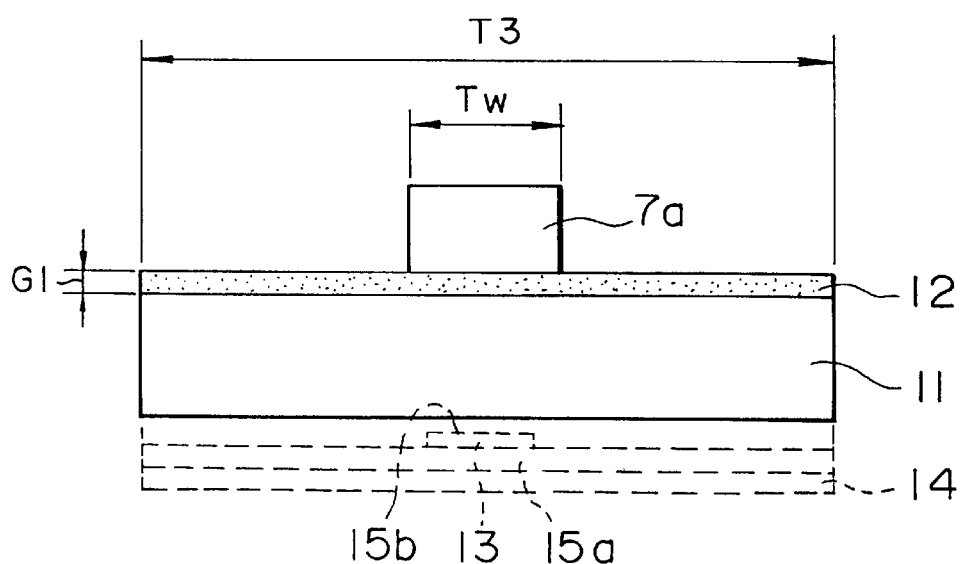
FIG. 15 is an enlarged fragmentary front view along the arrow XV in FIG. 14.

Although the write fringing can be suppressed at a height H larger than three times the thickness of the gap layer 3a, the film thickness of the lower-core layer 1 from the bottom surface 1e to the slanted surface 1b is substantially reduced and thus the function of the lower-core layer 1 as the upper-shielding layer against the magnetoresistive element 13 is reduced (refer to FIG. 15).

It is preferable that the tilting angle θ2 between the slant surface 1b of the lower-core layer 1 and the gap-facing surface 2b (or the boundary 1f) be in a range of 2 degrees to 10 degrees. If the tilting angle θ2 is lower than 2 degrees, a leakage magnetic field will readily occur between the lower-core layer 1 extending from the base end of the prominence 1a (the lower-core layer having the slanted surface 1b) and the upper-core layer 7, and thus the write fringing cannot be effectively reduced. On the other hand, if the tilting angle is larger than 10 degrees, the film thickness of the lower-core layer 1 is reduced particularly at both ends or the width T3 of the bottom surface 1e of the lower-core layer 1 is reduced. The function of the lower-core layer 1 as the upper-shielding layer against the magnetoresistive element 13 therefore is reduced (refer to FIG. 15).

Figure 3:
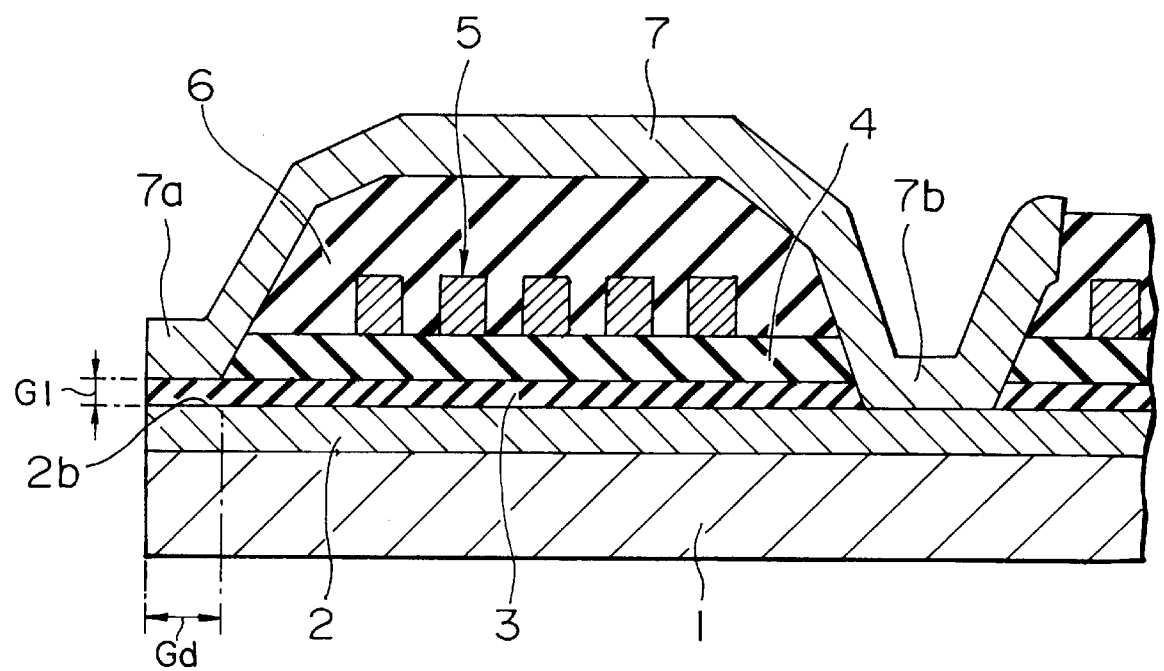
FIG. 3 is a cross-sectional view taken along sectional line III—III in the perspective view of the combination read/write thin film magnetic head shown in FIG. 2.

FIG. 3 is a cross-sectional view taken along sectional line III—III in the perspective view of the combination read/write thin film magnetic head shown in FIG. 2. FIG. 3 is also a cross-sectional view of the combination read/write thin film magnetic head shown in FIG. 1, in which identification number 1a is used for the prominence instead of 2 (hereinafter "prominence" is referred to as "prominence 2 (or 1a)"). The depth Gd of the prominence 2 (or 1a) shown in FIG. 3 is referred to as a gap depth.

A nonmagnetic material layer 3 is formed on the gap-facing surface 1d of the prominence 2 (or 1a), on the lower-core layer 1 other than the slanted surfaces 1b in the insulating layer 6, on both side faces of the lower-core layer 1 in the insulating layer 6, and over the region other than the lower-core layer 1. In a production process described below, the nonmagnetic material layer 3 is left on the gap-facing surface 1d of the prominence 2 (or 1a) as a gap layer 3a and removed from both sides of the gap-facing surface 1d.

The nonmagnetic material layer 3 has a monolayer or multilayer structure formed of $S_iO_2$, $Ta_2O_5$, $Si_3N_4$, TiO, $Ti_2O_3$, $Ti_3O_5$, $TiO_2$ and $WO_3$. These nonmagnetic materials can be chemically removed by a plasma etching process using a $CF_4$ based gas, as described later in detail. When a conventional nonmagnetic material, e.g. aluminum oxide ($Al_2O_3$), is used, a chlorine-based gas must be used in an etching process for removing the nonmagnetic material. Such a chlorine-based gas is, however, highly corrosive to the magnetic materials of the upper- and lower-core layers. In contrast, the combination of the above-specified nonmagnetic material and a $CF_4$ based gas in accordance with the present invention does not cause corrosion of the magnetic materials due to selective etching of the nonmagnetic material.

An insulating material 4 composed of an organic resinous material, e.g. a resist material, is formed on the nonmagnetic material layer 3. Further, a coil layer 5 composed of a highly conductive material, e.g. copper, is formed on the insulating layer 4. The coil layer 5 is spirally formed so as to surround the base end 7b of the upper-core layer 7. The coil layer 5 is covered with an insulating layer 6 composed of an organic resinous material.

The upper-core layer 7 is formed on the insulating layer 6 by a plating process. The upper-core layer 7 is composed of a magnetic material, e.g. permalloy, and the front end 7a is connected to the gap-facing surface 1d of the prominence 2 (or 1a) through the gap layer 3a to form a magnetic gap having a gap length G1.

The front end 7a of the upper-core layer 7 has a width Tw as shown in FIGS. 1 and 2. The width Tw is fully or substantially the same (Tw=T1) as the width T1 of the gap-facing surface 1d (or 2b) of the prominence 1a (or 2). The width Tw (=T1) determines the track width of the magnetic gap. The base end 7b of the upper-core layer 7 is magnetically connected to the lower-core layer 1 as shown in FIG. 3.

The upper-core layer 7 is covered with a protective film composed of a nonmagnetic material such as alumina not shown in the drawings.

In such an inductive head, a recording current flowing in the coil layer 5 induces a recording magnetic field in the lower-core layer 1 and the upper-core layer 7, the section corresponding to the gap length G1 records magnetic signals on a recording medium such as a hard disk by means of a leakage magnetic field between the prominence 1a (or 2) and the front end 7a of the upper-core layer 7. Since the width T1 of the gap-facing surface 1d (or 2d) of the prominence 1a (or 2) is fully or substantially the same as the width Tw of the front end 7a of the upper-core layer 7 in this inductive head, a region in which a recording magnetic field leaks out of the track width Tw can be narrowed and thus write fringing can be reduced.

When the prominence 1a is rectangular as shown in FIG. 1, the leakage magnetic field between the prominence 1a and the front end 7a of the upper-core layer 7 is securely controlled within the track width Tw and thus write fringing can be more effectively reduced.

Write fringing can also be effectively reduced compared to conventional heads even when the prominence 2 has tilting side faces 2a as shown in FIG. 2 and when the tilting angle θ1 of the tilting side faces 2a is in a range of 60 degrees to 120 degrees.

When the height H of the prominence 1a (or 2) is in a range of one to three times of the thickness of the gap layer 3a and the tilting angle θ2 of slanted surfaces 1b is in a range of 2 degrees to 10 degrees, write fringing is more effectively reduced without deteriorating the function of the lower-core layer 1 as the upper-shielding layer.

As described above, the magnetic head in accordance with the present invention can more effectively reduce write fringing. As a result, a shorter interval between tracks essential for high density recording is achieved on a recording material.

A production procedure for forming the lower-core layer 1 and the prominence 1a shown in FIG. 1 will now be described with reference to FIGS. 4A to 4D.

Figure 4A:
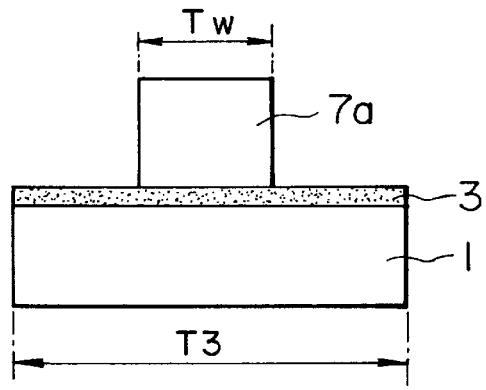
FIGS. 4A to 4D are fragmentary front views illustrating manufacturing steps of a combination read/write thin film magnetic head in accordance with a first method of the present invention.

As shown in FIG. 4A, a rectangular lower-core layer 1 composed of a soft magnetic material and having a width T3 is formed. A nonmagnetic material layer 3 having a monolayer, multilayer or composite structure composed of $S_iO_2$, $Ta_2O_5$, $Si_3N_4$, TiO, $Ti_2O_3$, $Ti_3O_5$, $TiO_2$ and $WO_3$ is formed on the lower-core layer 1. These nonmagnetic materials can be readily removed by a chemical etching process using $CF_4$ or $CF_4/O_2$ plasma described below.

The front end 7a, having a thickness Tw, of the upper-core layer 7 is formed on the nonmagnetic material layer 3 as follows. A resist pattern is formed on the nonmagnetic material layer 3 excluding the region in which the front end 7a is formed. A soft magnetic material is plated on the region in which the resist pattern is not formed, and then the resist pattern is removed.

Figure 4B:
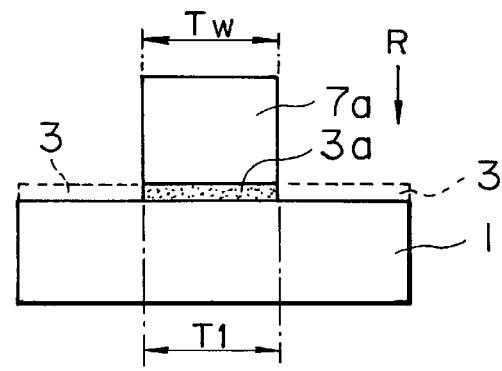

In FIG. 4B, the nonmagnetic material layer 3 between the front end 7a of the upper-core layer 7 and the lower-core layer 1 is left as a gap layer 3a and the nonmagnetic material layer 3 (shown by a broken line) at both ends is chemically removed by a plasma etching process. The nonmagnetic material layer 3 is formed of a nonmagnetic material such as $SiO_2$ which reacts with $CF_4$ or $CF_4/O_2$ mixed gas plasma in the plasma etching process. Since the plasma etching process chemically removes only the nonmagnetic material, soft magnetic materials which form the lower-core layer 1 and the upper-core layer 7 are not damaged by the plasma etching process.

The plasma etching in accordance with the present invention is anisotropic plasma etching as shown in FIG. 4B in which the etching is performed along the arrow R (vertical) direction. The gap layer 3a disposed between the front end 7a and the lower-core layer 1 is not removed over a range corresponding to the width Tw by the plasma etching process.

Figure 4C:
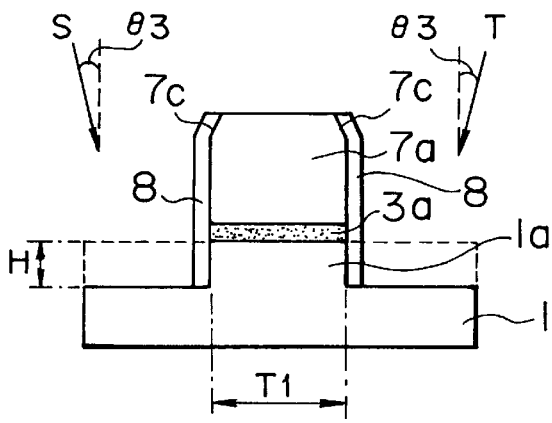

In FIG. 4C, a prominence 1a is formed on the lower-core layer 1 by a first ion milling process using neutrally ionized gaseous argon (Ar). The lower-core layer 1 is irradiated with argon ions along the arrows S and T. It is preferable that radiation angle θ3 of argon ions be in a range of 0 to 30 degrees. The lower-core layer 1 therefore is irradiated along the substantially vertical direction with argon ions in the first ion milling process.

Both side sections of the lower-core layer 1 and the gap layer 3a are horizontally trimmed by means of physical effects of radiated ions along the arrows S and T such that the trimmed sections have a rectangular shape. The vertical bump is formed on the lower-core layer 1, and a rectangular prominence 1a having the width T1 which is the same as the width Tw of the front end 7a is formed under the gap layer 3a.

It is preferable that the ion milling process conditions, such as time, be adjusted such that the height H of the prominence 1a is one to three times of the thickness of the gap layer 3a.

Tilting surfaces 7c are simultaneously formed on the front end 7a of the upper-core layer 7 by the ion milling process. The magnetic material of the lower-core layer 1 in the broken line is adhered to the front end 7a of the upper-core layer 7, and both side faces of the gap layer 3a and prominence 1a to form magnetic material layers 8 during the ion milling process.

Figure 4D:
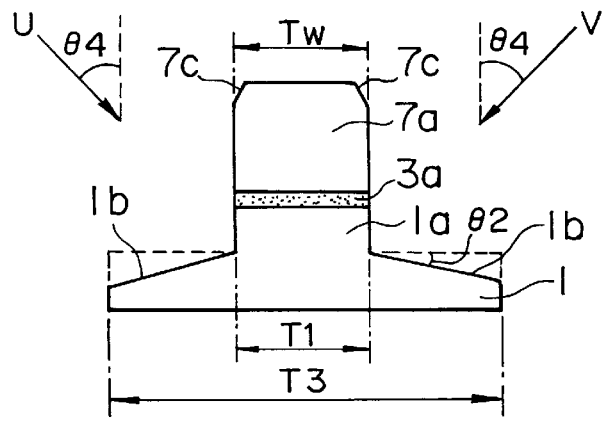

In FIG. 4D, slanted surfaces 1b are formed on the lower-core layer 1 by a second ion milling process using neutrally ionized gaseous argon (Ar) as in the first ion milling process. The lower-core layer 1 is irradiated with argon ions along the arrows U and V. It is preferable that radiation angle θ4 of argon ions be in a range of 40 degrees to 80 degrees. The lower-core layer 1 therefore is obliquely irradiated with the argon ions in the second ion milling process unlike the first ion milling process.

The upper surfaces of the lower-core layer 1, which are present at both sides of the prominence 1a, are obliquely trimmed by means of physical effects of argon ions along the arrows U and V to form the slanted surfaces 1b. It is preferable that the ion milling process conditions, such as time, be adjusted such that the tilting angle θ2 of the slanted surfaces 1b is in a range of 2 degrees to 10 degrees.

The second ion milling process also trims the front end 7a of the upper-core layer 7, the gap layer 3a and the magnetic material layers 8 adhered to both sides of the prominence 1a. The removal of the magnetic material layer 8 prevents magnetic short-circuiting between the front end 7a and the prominence 1a.

The production process described above with reference to FIGS. 4A to 4D is summarized as follows. A nonmagnetic material layer 3 is removed by an anisotropic etching process shown in FIG. 4B from a conventional state shown in FIG. 4A (refer to FIG. 8). Both rectangular sections of the lower-core layer 1 are trimmed by a first ion milling process along the almost the vertical direction to form a rectangular prominence 1a having a width T1, which is substantially the same as the width Tw of the front end 7a, under the gap layer 3a as shown in FIG. 4C. The slanted surfaces 1b are formed by the second ion milling process along the oblique directions in FIG. 4D and the magnetic material layers 8 can be simultaneously removed from the gap layer 3a in the step shown in FIG. 4c.

A production procedure for forming the lower-core layer 1 and the prominence 2 of the combination read/write thin film magnetic head shown in FIG. 2 will now be described with reference to FIGS. 5A to 5D, 6A and 6B.

Figure 5A:
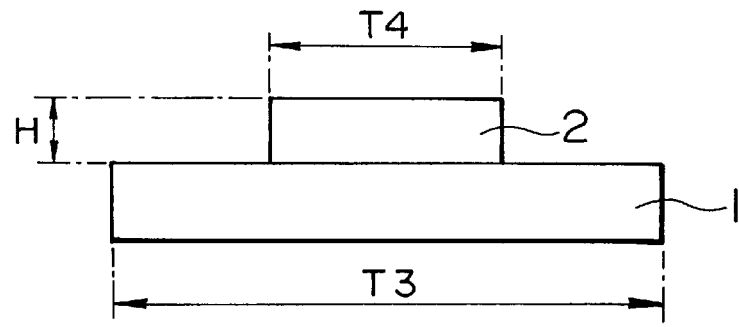
FIGS. 5A to 5D and 6A to 6B are fragmentary front views illustrating manufacturing steps of a combination read/write thin film magnetic head in accordance with a second method of the present invention.

A lower-core layer (first layer) 1 having a rectangular front view and a width T3 is formed by plating a soft magnetic material having a high magnetic permeability such as permalloy as shown in FIG. 5A. A resist material is applied onto the lower-core layer 1, exposed and developed such that the resist material is removed over the section having a width T4. A soft magnetic material, which is also used in the lower-core layer 1, is deposited on the section having the width T4 by a plating or sputtering process to form a rectangular prominence (second layer) 2 having a width T4. The resist material which is left at both sides of the prominence 2 is removed. It is preferable that the height H of the prominence 2 be 1 to 3 times of the thickness of a nonmagnetic material layer 3 described in the following step.

Figure 5B:
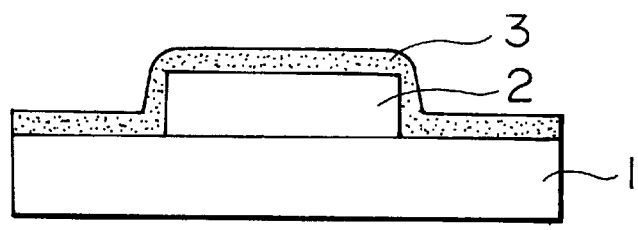

The nonmagnetic material layer 3 is formed over the lower-core layer 1 and the prominence 2 (including regions other than the lower-core layer 1) as shown in FIG. 5B. The nonmagnetic material layer is formed by a nonmagnetic material which can be chemically removed by a $CF_4$ or $CF_4/O_2$ plasma etching process. Examples of such nonmagnetic materials include monolayer, multilayer and composite materials composed of $SiO_2$, $Ta_2O_5$, $Si_3N_4$, $TiO$, $Ti_2O_3$, $Ti_3O_5$, $TiO_2$, and $WO_3$.

Figure 5C:
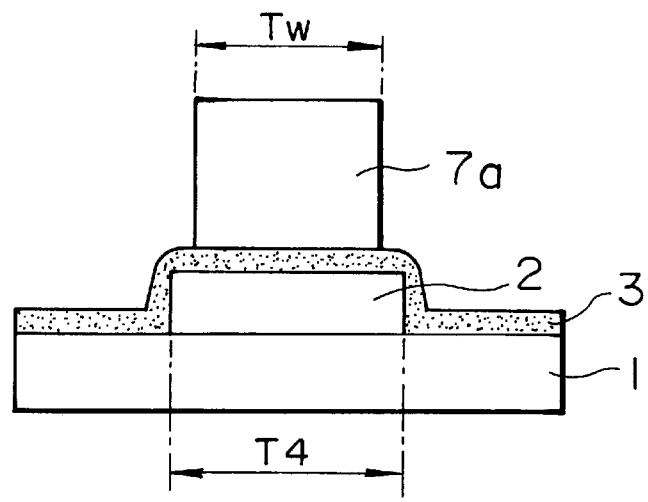

In FIG. 5C, an upper-core layer 7 having a width Tw is formed on the nonmagnetic material layer 3 such that the front end 7a of the upper-core layer 7 is jointed to the nonmagnetic material layer 3 as follows. A resist pattern is formed on the upper-core layer 7 excluding the region having the width Tw by a plating process or the like, a soft magnetic material is deposited on the region on which a resist pattern is formed, and the resist material is removed. The formed front end 7a of the upper-core layer 7 therefore has a width Tw.

In FIG. 5C, the width Tw of the upper-core layer 7 is slightly smaller than the width T4 of the rectangular prominence 2. The width difference Tw-T4 is determined so that the front end 7a is surely disposed within the width T4 of the prominence 2 in consideration of tolerances of a position forming the prominence 2, the width T4, a position forming the front end 7 of the upper-core layer 7 and width Tw.

Figure 5D:
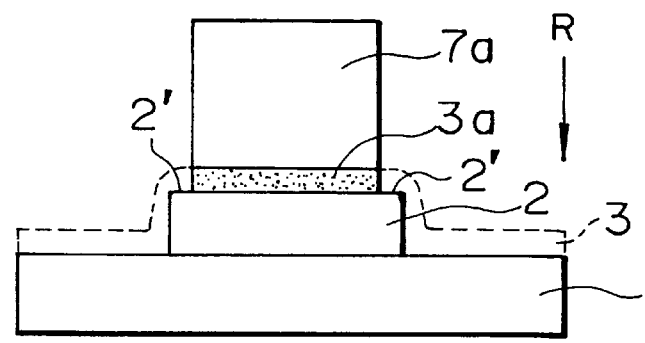

In FIG. 5D, the nonmagnetic material layer 3 disposed between the front end 7a of the upper-core layer 7 and the prominence 2 is left as a gap layer 3a, whereas the nonmagnetic material layer 3 (as shown in broken lines) at both sides is removed by a plasma etching process. Both upper corner sections 2' of the prominence 2 thereby are exposed at both sides of the gap layer 3a.

The nonmagnetic material layer 3 is formed of a monolayer, multilayer or composite material of $SiO_2$, $Ta_2O_5$, $Si_3N_4$, $TiO$, $Ti_2O_3$, $Ti_3O_5$, $TiO_2$, and $WO_3$. These materials react with $CF_4$ or $CF_4/O_2$ mixed gas plasma in the plasma etching process and surely remove the nonmagnetic material layer 3 other than the gap layer 3a.

The plasma etching in accordance with the present invention is anisotropic plasma etching as shown in FIG. 5D in which the etching is performed along the arrow R (vertical) direction. The gap layer 3a disposed between the front end 7a and the prominence 2 is not removed over a range corresponding to the width Tw (=T1) by the plasma etching process. Since the plasma etching process chemically removes the nonmagnetic material, soft magnetic materials which form the lower-core layer 1 and the prominence 2 are not damaged by the plasma etching process.

Figure 6A:
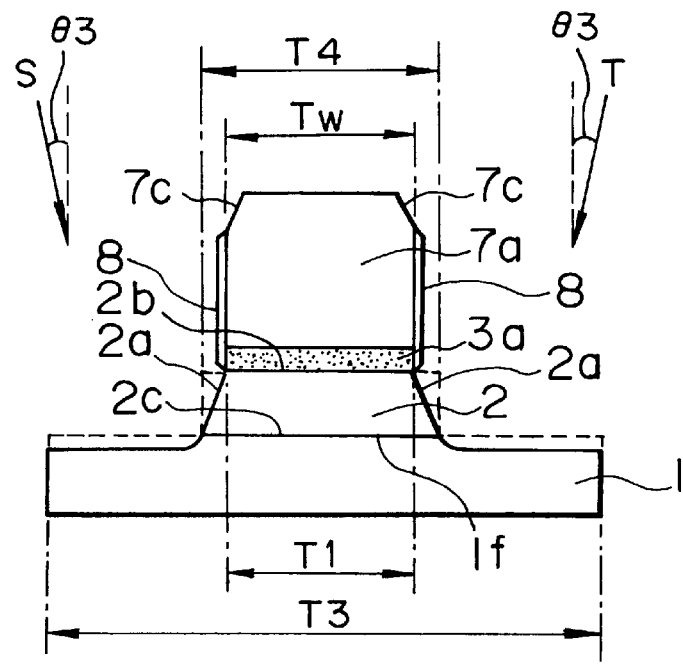

In FIG. 6A, the upper corner sections 2' are trimmed by a second ion milling process using neutrally ionized gaseous argon (Ar). The lower-core layer 1 is irradiated with argon ions along the arrows S and T. It is preferable that radiation angle θ3 of argon ions be in a range of 0 to 30 degrees. The upper surface of the lower-core layer 1 therefore is irradiated along the substantially vertical direction with the argon ions in the first ion milling process.

Both corner sections 2' of the prominence 2 and the upper surface of the lower-core layer 1 other than the section under the prominence 2 are trimmed by means of physical effects of radiated ions along the arrows S and T. As a result, the width T1 of the gap-facing surface 2b of the prominence 2 is the same as the width Tw of the front end 7a of the upper-core layer 7a, and tilting side faces 2a are formed on the both sides of the gap-facing surface 2b so that the prominence 2 forms a trapezoidal cross-section.

The time period for the first ion milling process is considerably shorter than that in FIG. 4C, because the corner sections 2' of the prominence 2 are very rapidly trimmed. Both sides of the facing surface if of the lower-core layer 1 therefore are slightly trimmed. Also the upper corners of the front end 7a of the upper-core layer 7 are trimmed to form slanted surfaces 7c. The trimmed magnetic material represented by the broken lines is slightly deposited on both sides of the gap layer 3a and front layer 7a to form magnetic films 8.

Figure 6B:
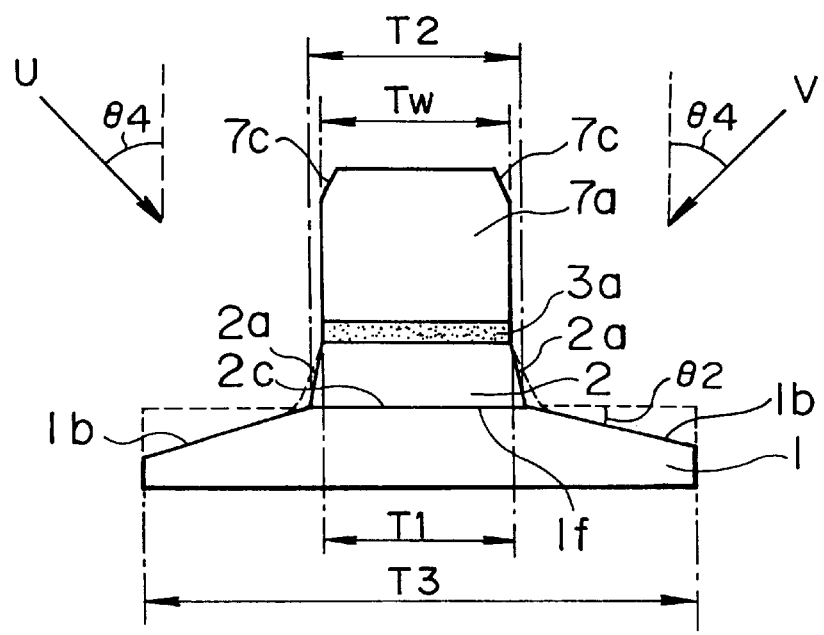

In FIG. 6B, the prominence 2 is trimmed into a more rectangular shape by a second ion milling process, and slanted surfaces 1b are formed on the lower-core layer 1.

The second ion milling process uses neutrally ionized gaseous argon (Ar) as in the first ion milling process. The lower-core layer 1 is irradiated with argon ions along the arrows U and V. It is preferable that radiation angle θ4 of argon ions be in a range of 40 degrees to 80 degrees. The lower-core layer 1 therefore is obliquely irradiated with the argon ions in the second ion milling process unlike the first ion milling process.

The slanted surfaces 2a of the prominence 2 are obliquely trimmed by means of physical effects of argon ions along the arrows U and V to change the prominence 2 into a more rectangular shape. The width of the boundary 2c between the prominence 2 and the lower-core layer 1 therefore is reduced from T4 to T2. The prominence 2 can be trimmed into a rectangular shape by adjusting the ion milling conditions, such as time, as in FIG. 1.

Slanted surfaces 1b are also formed on the both sides of the facing surface 1f, facing the prominence 2, of the lower-core layer 1 during the ion milling process. It is preferable that the ion milling process conditions, such as time, be adjusted such that the tilting angle θ2 of the slanted surfaces 1b is in a range of 2 degrees to 10 degrees.

The second ion milling process also trims the magnetic films 8 formed on the both sides of the gap layer 3a and front end 7a of the upper-core layer 7. The removal of the magnetic material layer 8 prevents magnetic short-circuiting between the front end 7a and the prominence 2.

In the process shown in FIGS. 5 and 6, the prominence 2 having a width T4 slightly larger than the width Tw of the front end 7a is formed on the lower-core layer 1, followed by anisotropic plasma etching, first and second ion milling processes.

The width T1 of the gap-facing surface 2b therefore can be equalized to the width Tw of the front end 7a of the upper-core layer 7. Particularly, the second ion milling process shown in FIG. 6B can reduce the width of the boundary 2c between the prominence 2 and the lower-core layer 1 from T4 to T2 and trim the prominence 2 into a more rectangular shape. The slanted surfaces 1b are also formed on the lower-core layer 1 and the magnetic films 8 adhered to the both sides of the gap layer 3a etc., are removed in the ion milling process.

Figure 7:
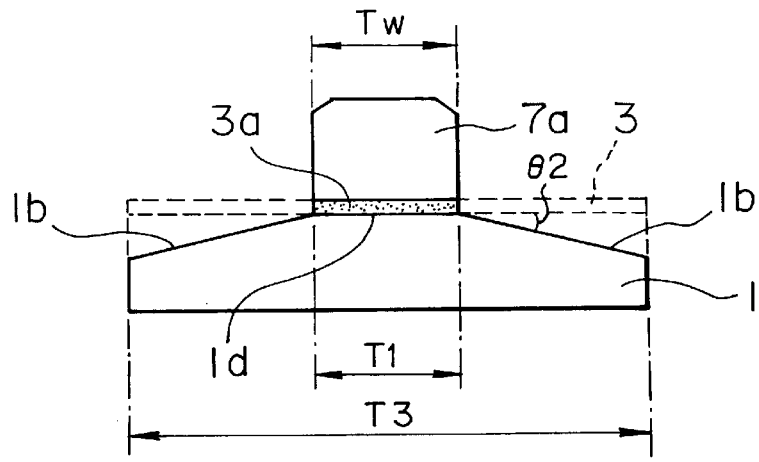
FIG. 7 is an enlarged front view of a third embodiment of a magnetic head in accordance with the present invention.

FIG. 7 is a front view of a third embodiment of a magnetic head in accordance with the present invention, in which no prominence is provided on the lower-core layer 1 composed of a magnetic material, such as permalloy.

The nonmagnetic material layer 3 (represented with broken lines in FIG. 7) formed on the lower-core layer 1 as shown in FIG. 4A is chemically removed at the both sides of the front end 7a by an anisotropic plasma etching process as in FIG. 4B or FIG. 5D whereas the gap layer 3a between the lower-core layer 1 and the front end 7a is left.

Both sides other than the facing surface 1d of the lower-core layer 1 are trimmed to form slanted surfaces 1b having a tilting angle θ2 by a second ion milling process along the arrows S and T as in FIG. 4D or FIG. 6B.

In this case, the nonmagnetic material layer 3 is formed of a material which can be chemically removed by a plasma etching process and does not damage the magnetic material of the lower-core layer 1 during the plasma etching process, e.g. $SiO_2$.

In FIG. 7, the nonmagnetic material layer 3 is removed, and then slanted surfaces 1b are formed on the lower-core layer 1 without forming a prominence by the second ion milling process under the condition of an ion radiation angle of 40 degrees to 80 degrees.

This process can also equalize the width T1 of the facing surface 1d of the lower-core layer 1 with the width Tw of the front end 7a, and thus can more effectively prevent write fringing compared to conventional magnetic heads.

In the combination read/write thin film magnetic head shown in FIG. 7, since the distance between the front end 7a of the upper-core layer 7 and the lower-core layer 1 (having slanted surfaces 1b) is significantly short at the both sides of the front end 7a, a leakage magnetic field is relatively easily formed on both sides of the track width Tw. The combination read/write thin film magnetic film shown in FIG. 7 does not show so satisfactory reduction of write fringing compared to those shown in FIGS. 1 and 2.

More effective reduction of write fringing in combination read/write thin film magnetic film shown in FIG. 7 can be achieved by increasing the tilting angle θ2 of the slanted surfaces 1b of the lower-core layer 1, so long as the function of the lower-core layer as the upper-shielding layer does not decrease.

EXAMPLE

Write fringing was evaluated using some combination read/write thin film magnetic heads having different shapes of lower-core layers 1 and prominence 1a (or 2) and different sizes.

The following combination read/write thin film magnetic heads were evaluated.

(1) A conventional combination read/write thin film magnetic head A shown in FIG. 15.

Figure 16A:
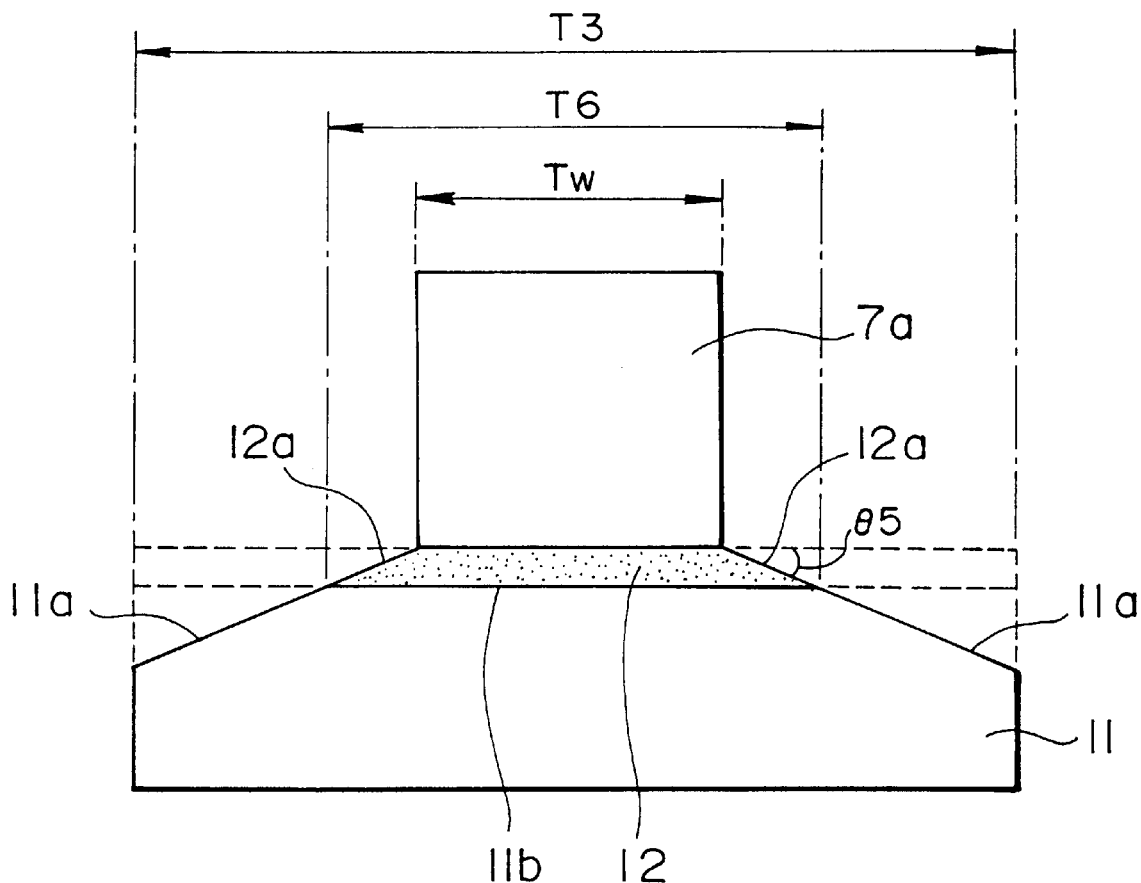
FIGS. 16A and 16b are fragmentary front views of a core layer structure of an conventional head having improved write fringing.
Figure 16B:
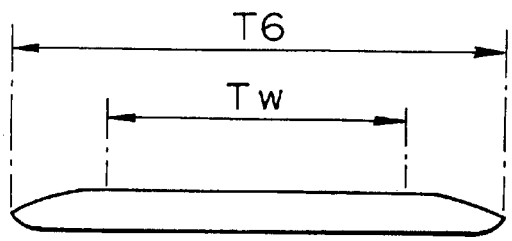

(2) A conventional combination read/write thin film magnetic head B shown in FIG. 16, in which the tilting angle θ5 of the slanted surfaces 11a and 12a formed on the lower-core layer 11 and the gap layer 12 is 3 degrees.

(3) Combination read/write thin film magnetic heads C1 and C2 in accordance with the third embodiment of the present invention shown in FIG. 7, in which the tilting angles of the slanted surfaces 1b formed on the lower-core layer 1 are 2 degrees and 4 degrees, respectively.

(4) Combination read/write thin film magnetic heads D1, D2 and D3 in accordance with the second embodiment of the present invention shown in FIG. 2, in which the height H of the prominence 2 formed on the lower-core layer 1 is 0.5 μm for all the heads, the tilting angles θ1 of the slanted surfaces 2a formed on the prominence 2 are 30 degrees for D1, 45 degrees for D2 and D3, and the tilting angles θ2 of the slanted surfaces 1b formed on the lower-core layer 1 are 2 degrees for D1 and D2 and 5 degrees for D3.

(5) Combination read/write thin film magnetic heads E1, E2 and E3 in accordance with the first embodiment of the present invention shown in FIG. 1, in which the heights H of the prominence 1a formed on the lower-core layer 1 are 0.2 μm for E1, 0.4 μm for E2 and E3 and, and the tilting angles θ2 of the slanted surfaces 1b formed on the lower-core layer 1 are 2 degrees for E1 and E2 and 5 degrees for E3.

All the combination read/write thin film magnetic heads had the same thickness of the gap layer of 0.3 μm.

Signals were recorded with each of the combination read/write thin film magnetic heads the on a recording magnetic medium and the width To of the signals was determined with a magnetic force microscope (MFM).

The width Tw of the front end of the upper-core layer of each combination read/write thin film magnetic head was determined with a scanning electron microscope.

Figure 8:
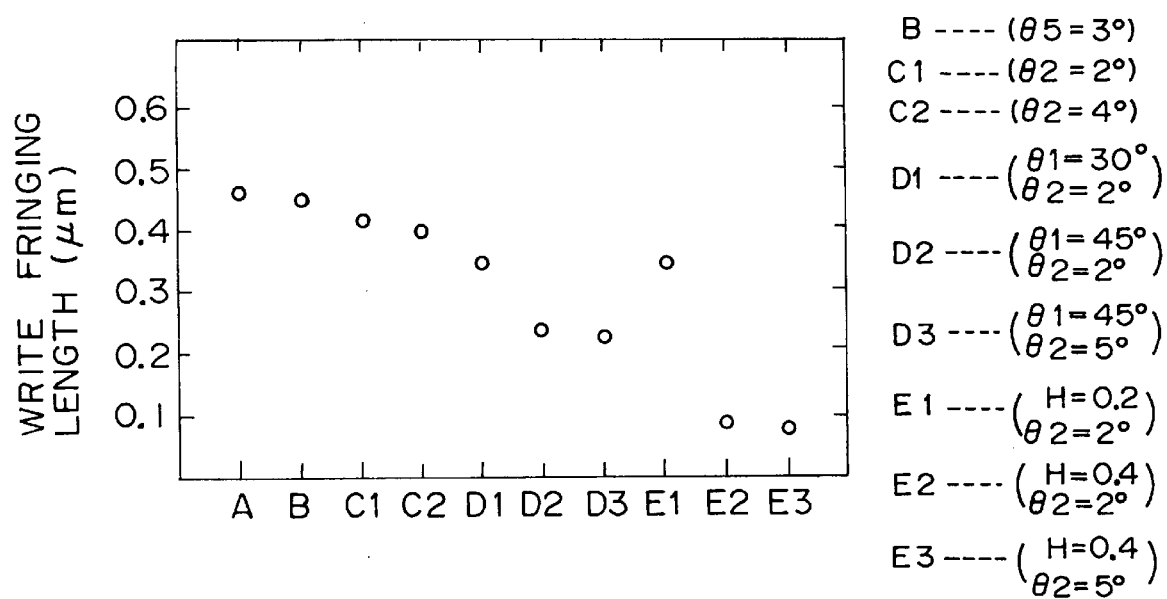
FIG. 8 is a graph illustrating write fringing lengths, determined by a first method, of various combination read/write thin film magnetic heads having different lower-core layers and prominence.

The write fringing length of each head was calculated from the difference between the width To of the recorded signals and the width Tw of the front. FIG. 8 is a graph illustrating write fringing lengths of the combination read/write thin film magnetic heads.

FIG. 8 shows that combination read/write thin film magnetic heads D1 to D3 and E1 to E3 each having a prominence on the lower-core layer 1 have smaller write fringing lengths than other combination read/write thin film magnetic heads. Among combination read/write thin film magnetic heads D1 to D3, as the tilting angle θ1 of the slanted surface 2a formed on the prominence 2 increases from 30 degrees to 45 degrees, the write fringing length decreases. Combination read/write thin film magnetic heads E2 and E3 each having a tilting angle θ1 of approximately 90 degrees have smaller write fringing lengths compared to combination read/write thin film magnetic heads D1 to D3.

These results demonstrate that the prominence formed on the lower-core layer can effectively suppress write fringing and a rectangular prominence is preferred to more effectively suppress write fringing.

Among combination read/write thin film magnetic heads C1 and C2, as the tilting angle θ2 of the slanted surface 1b formed on the lower-core layer 1 increases from 2 degrees to 4 degrees, the write fringing length decreases. The same trend is noticeable in comparison of magnetic head D2 with magnetic head D3, and magnetic head E2 with magnetic head E3. In the present invention, the dependence of the tilting angle θ2 of the lower-core layer 1 on write fringing was also studied as described later.

Among combination read/write thin film magnetic heads E1 to E3, magnetic heads E2 and E3 have satisfactorily small write fringing lengths, whereas magnetic heads E1 has a significantly large write fringing length. Such a large write fringing length is supposed that combination read/write thin film magnetic head E1 has a shape very similar to that of combination read/write thin film magnetic head D (shown in FIG. 7) because the height H of the prominence 1a formed on the lower-core layer 1 is small. The dependence of the height H of the prominence 1a on write fringing was also studied as described later.

Write fringing was evaluated by another method using the same combination read/write thin film magnetic heads.

The experimental procedure will now be described with reference to an image graph shown in FIG. 9. A signal X was recorded on a reference write track in a recording medium, a signal Y was recorded on a position far away from the reference write track, and then a signal Z was recorded on a position at a distance of approximately 1.5 to 1.6 times the track width Tw(optical) which was optically determined from the center of the signal Y.

One of the combination read/write thin film magnetic heads (A to E3) was disposed in the middle of the two signals X and Y to erase the edge portions X1 and Y1 of the signals X and Y. The signals X, Y2 (=Y−Y1), and Z2 (=Z −Z1) were regenerated with a reading head (composed of a magnetoresistive element) of the combination read/write thin film magnetic head. The regenerated waveforms X3, Y3 and Z3 shown in FIG. 9 were obtained.

Figure 9:
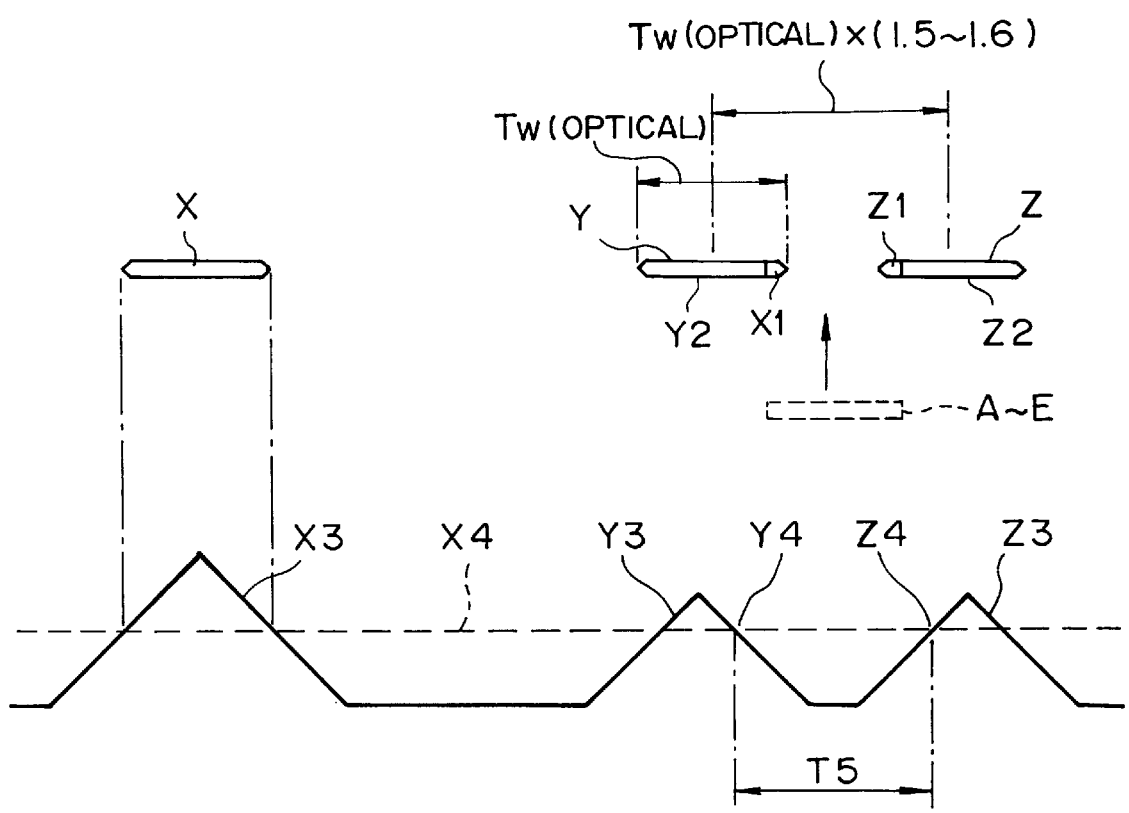
FIG. 9 is an schematic graph for illustrating a second method for determining write fringing.

The crossing points Y4 and Z4 in which the line X4 corresponding to a half the height of the regenerated waveform X3 crosses the regenerated waveforms Y3 and Z3, respectively, were determined as shown in FIG. 9 and the width T5 between the crossing points Y4 and Z4 was measured. The width T5 is referred to as a DC erase band width, and the difference between the DC erase band width T5 and the track width Tw(optical) corresponds to the write fringing length in the experiments. The results are shown in FIG. 10.

Figure 10:
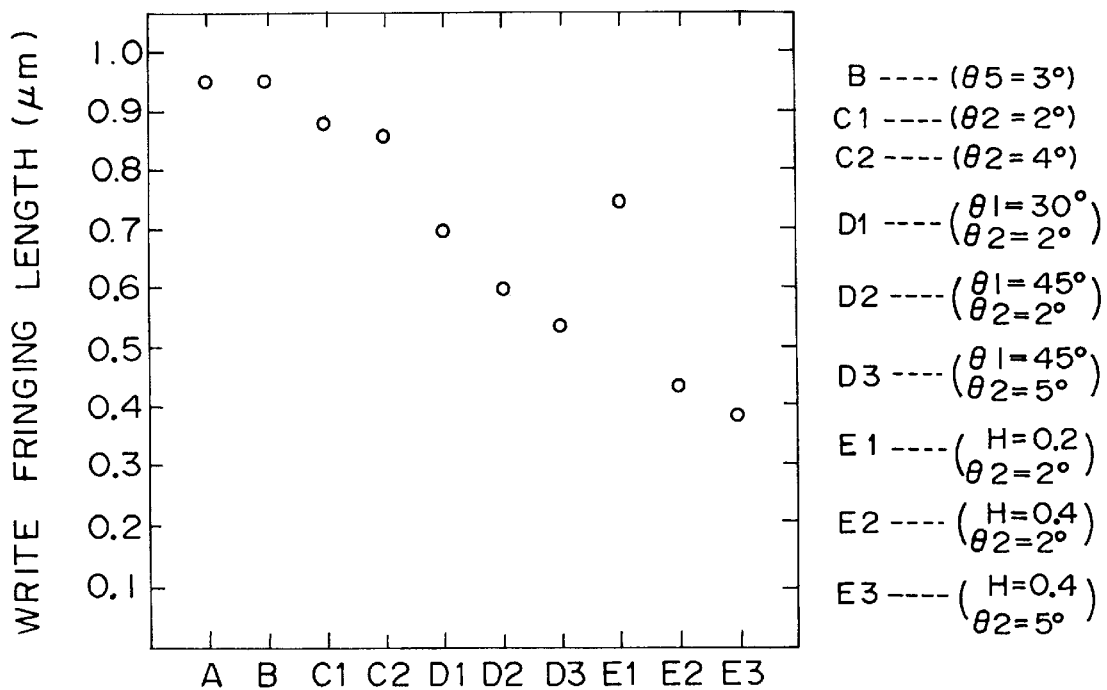
FIG. 10 is a graph illustrating write fringing lengths, determined by a second method, of various combination read/write thin film magnetic heads having different lower-core layers and prominence.

Although the write-fringing lengths shown in FIG. 10 are larger than those shown in FIG. 8, and the order of the write-fringing lengths of the combination read/write thin film magnetic heads is quite the same in FIGS. 10 and 8. Combination read/write thin film magnetic heads D1 to E3 each having a prominence have low write fringing lengths compared to combination read/write thin film magnetic heads A to C2 each not having a prominence.

Figure 11:
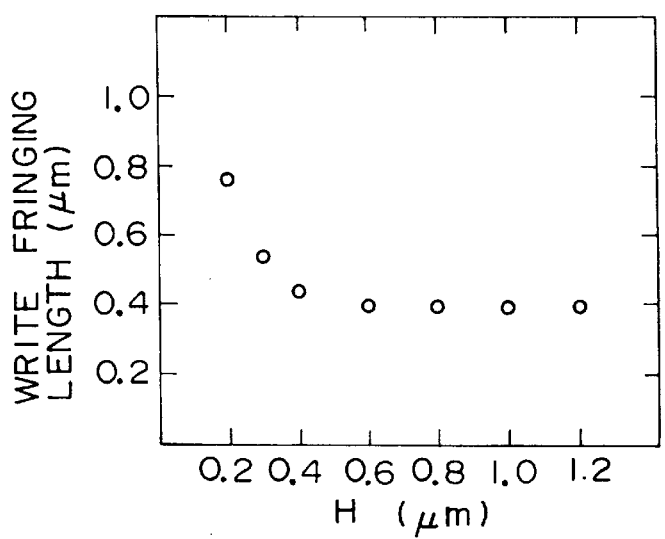
FIG. 11 is a graph illustrating a correlation between the write fringing length, determined by a second method, and the height H of the prominence of the combination read/write thin film magnetic head shown in FIG. 1 having a tilting angle θ2 of 2 degrees of the slanted surface of the lower-core layer.

FIG. 11 is a graph illustrating a correlation between the write fringing length and the height H of the prominence 1a of the combination read/write thin film magnetic head E shown in FIG. 1 having a tilting angle θ2 of 2 degrees of the slanted surface 1b of the lower-core layer 1. The thickness of the gap layer 3a was 0.3 µm. The write fringing lengths were determined by the method as in FIG. 9.

FIG. 11 demonstrates that, at a height H of the prominence 1a less than 0.6 µm the write fringing length decreases with the increased height, whereas at a height H more than 0.6 µm the write fringing length is substantially constant.

Such a decrease in the write fringing length due to an increased height H of the prominence 1a is explained as follows: The distance between the front end 7a of the upper-core layer 7 and the lower-core layer 1 extending to both sides of the base end of the prominence 1a (the lower-core layer having slanted surfaces 1b) increases, and a leakage magnetic field can be more readily generated between the prominence 1a and the front end 7a of the upper-core layer 7.

The thickness of the gap layer 3a was 0.3 µm in the experiments. The write fringing length can be further decreased by increasing the height H of the prominence 1a to approximately 0.3 µm as shown in FIG. 11. Since the write fringing length cannot be further reduced at a height H of the prominence 1a larger than 0.3 µm, the height H of the prominence in the present invention is set to be 1 to 3 times the thickness of the gap layer 3a.

Figure 12:
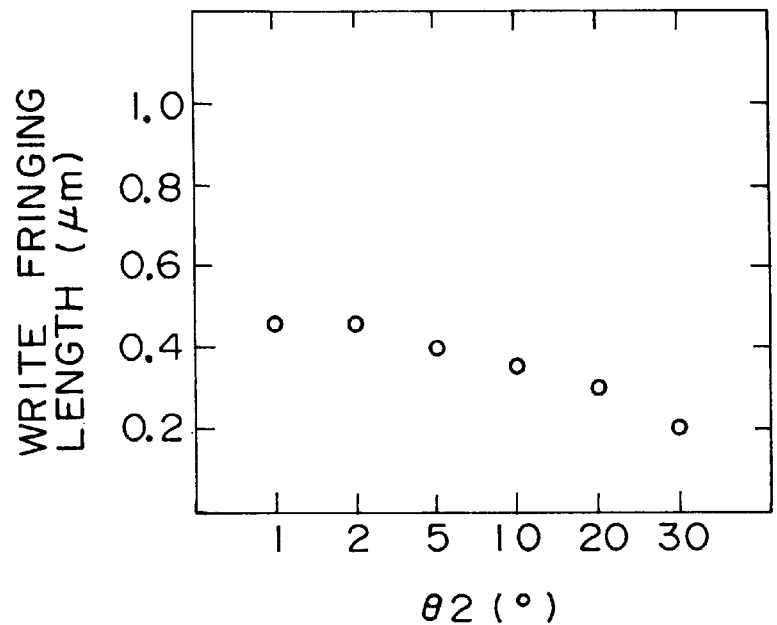
FIG. 12 is a graph illustrating a correlation between the write fringing length, determined by a second method, and the tilting angle θ2 of the slanted surface of the lower-core layer in combination read/write thin film magnetic heads provided with a prominence having a height H of 0.4 μm.

FIG. 12 is a graph illustrating a correlation between the write fringing length and the tilting angle θ2 of the slanted surface 1b of the lower-core layer 1 in the combination read/write thin film magnetic heads E provided with a prominence 1a having a height H of 0.4 µm. The thickness of the gap layer was 0.3 µm. The write fringing length was evaluated by a method as in FIG. 9.

FIG. 12 demonstrates that the write fringing length decreases with an increased tilting angle θ2 of the slanted surface 1b of the lower-core layer. Such a decrease in the write fringing length is explained as follows: The distance between the front end 7a of the upper-core layer 7 and the lower-core layer 1 extending to both sides of the base end of the prominence 1a (the lower-core layer having slanted surfaces 1b) increases, and a leakage magnetic field can be more readily generated between the prominence 1a and the front end 7a of the upper-core layer 7. An excessively large tilting angle θ2, however, causes a decreased thickness from the bottom surface 1e of the lower-core layer 1 to the slanted surface 1b or a decreased width T3 of the bottom surface 1e, and thus the function of the lower-core layer 1 as the upper-shielding layer deteriorates. The tilting angle θ2 of the slanted surface 1b in the present invention therefore is set to be in a range of 2 degrees to 10 degrees.

Figure 13:
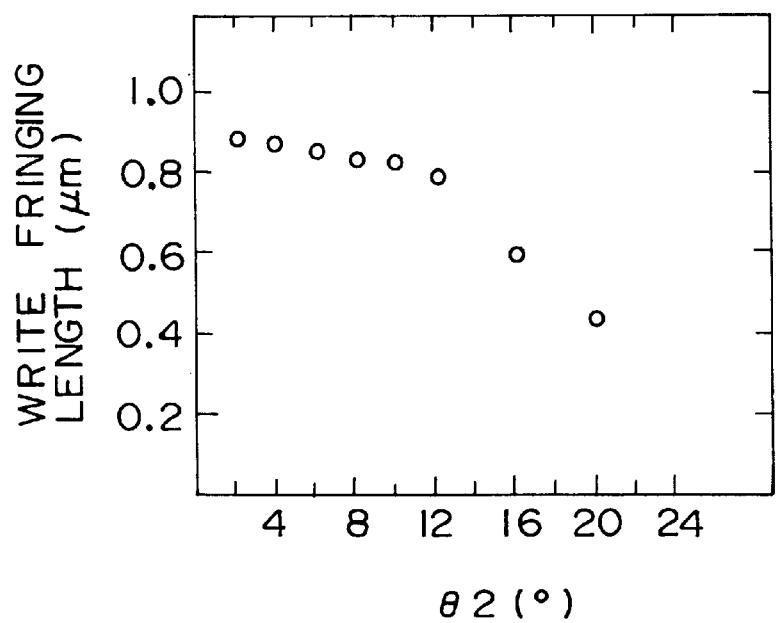
FIG. 13 is a graph illustrating the write fringing lengths, determined by a second method, of the combination read/write thin film magnetic heads shown in FIG. 7 and having different tilting angles θ2 of the slanted surface of the lower-core layer.
Figure 14:
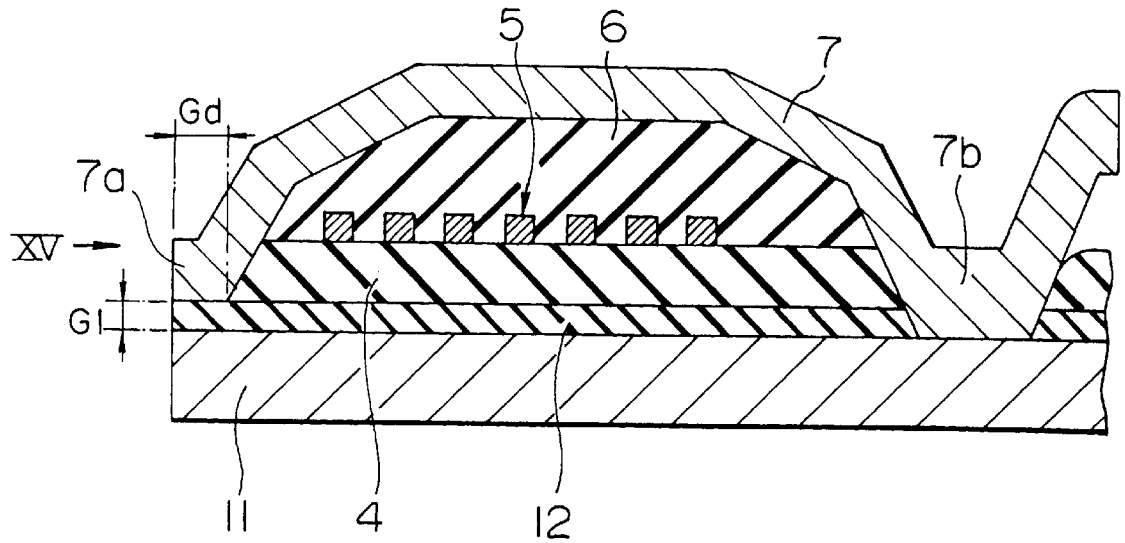
FIG. 14 is a longitudinal sectional-view of a conventional combination read/write thin film magnetic head.

FIG. 13 is a graph illustrating the write fringing lengths of combination read/write thin film magnetic heads C shown in FIG. 7 and having different tilting angles θ2 of the slanted surface 1b of the lower-core layer 1. The thickness of the gap layer 3a was 0.3 µm, and the write fringing length was measured by a method as in FIG. 9.

FIG. 13 demonstrates that the write fringing length decreases with an increased tilting angle θ2 of the slanted surface 1b. The slanted surfaces 1b formed on both sides of the lower-core layer 1 therefore is effective in suppression of write fringing. FIGS. 12 and 13 demonstrate that the tilting angle θ2 in the magnetic head C must be noticeably large in order to achieve the effective suppression of write fringing which was observed in the magnetic head E, because the magnetic head C is not provided with a prominence.

As shown in FIGS. 1 and 2, it is preferable that a prominence 1a (or 2) be formed on the lower-core layer 1 in view of suppression of write fringing, and it is more preferable that the prominence 1a be rectangular as shown in FIG. 1.

Also it is preferable in view of suppression of write fringing without deterioration of the function of the lower-core layer 1 as the upper-shielding layer that the height H of the prominence 1a be 1 to 3 times of the thickness of the gap layer, and the tilting angle θ2 of the slanted surfaces 1b of the lower-core layer 1 formed on both sides of the prominence 1a be in a range of approximately 2 degrees to 10 degrees.

As described above, a prominence is formed on the lower-core layer, the width T1 of the prominence at the gap-facing surface is substantially the same as the thickness Tw of the upper-core layer, and slanted surfaces extending from the base end of the prominence to the both sides are formed on the lower-core layer. Write fringing thereby can be effectively suppressed.

A rectangular prominence can further suppress write fringing since a leakage magnetic field generated between the upper-core layer and the prominence can be controlled within the track width Tw.

When the height H of the prominence is 1 to 3 times of the thickness of the gap layer and the tilting angle of the slanted surfaces on the lower-core layer is in a range of 2 degrees to 10 degrees, write fringing is more effectively suppressed without deterioration of the function of the lower-core layer as the upper-shielding layer.

In the first manufacturing method in accordance with the present invention in which the lower-core layer and the prominence is integrally formed, after removing the nonmagnetic material layer a rectangular prominence can be formed on the lower-core layer by a first ion milling process along the vertical direction, and the width T1 of the prominence can be equalized with the width Tw of the upper-core layer with high accuracy. Further, slanted surfaces can be formed on the upper surfaces of the lower-core layer extending from the base end of the prominence to both sides by a second milling process along the oblique direction.

In the second manufacturing method in accordance with the present invention in which a prominence is previously deposited on the lower-core layer, after removing the nonmagnetic material layer the width T1 of the prominence can be equalized with the width Tw of the upper-core layer with high accuracy by forming slanted surfaces on the prominence by the first milling process. Further, a substantially rectangular prominence can be formed and the slanted surfaces can be formed on the upper surfaces of the lower-core layer extending from the base end of the prominence to both sides by the second milling process.

Since the gap layer is composed of a nonmagnetic material, e.g. $SiO_2$, which can be removed by a plasma etching process, only the nonmagnetic material layer can be removed without deterioration of magnetic material layers such as the lower-core layer by the plasma etching process.

What is claimed is:

1. A combination read/write thin film magnetic head comprising
    a gap depth region (Gd) which includes an upper-core layer and a lower-core layer sandwiching therebetween a gap layer, said gap depth region further including a magnetoresistive sensor layer which is sandwiched by a lower-shielding layer and said lower-core layer, which also functions as an upper-shielding layer, each of said upper-core layer, said gap layer and said lower-core layer being arranged in parallel to one another,
    said gap depth region having at its front end a planar floating surface facing a recording medium, said floating surface having a width in a lateral direction perpendicular to a moving direction of said recording medium, each of said upper-core layer, said gap layer and said lower-core layer each having a front surface coplanar with said floating surface, said head characterized in that:
    (a) said front surface of said upper-core layer has in said lateral direction a width which defines a track width (Tw) of said recording medium;
    (b) said front surface of said gap layer has in said lateral direction a width which is equal in length to said track width (Tw);
    (c) said lower-core layer includes in said gap depth region a lower-core body and a prominence, each having a front surface coplanar with said floating surface,
    said prominence having a top surface contacting with said gap layer and a bottom surface contacting with said lower-core body, said front surface of said prominence having in said lateral direction a width (T1) at said top surface and a width (T2) at said bottom surface, the width (T1) of said prominence being equal in length to said track width (Tw), said prominence also having side surfaces bounded by its front, top and bottom surfaces,
    said lower-core body having a bottom surface at which said lower-core body has a width (T3) in said lateral direction, the width (T3) of said lower-core body being longer than the width (T2) of said prominence, said lower-core body having slanted surfaces bounded by its front surface, said slanted surfaces being contiguous with said side surfaces of said prominence and extending therefrom toward a plane coextensive with the bottom surface of said lower-core body, and
    (d) said gap layer is made of at least one nonmagnetic material selected from the group consisting of $SiO_2$, $Ta_2O_5$, $Si_3N_4$, TiO, $Ti_2O_3$, $Ti_3O_5$, $TiO_2$, and $WO_3$, said gap layer being chemically more etchable than said upper- and lower-core layers.

2. A combination read/write thin film magnetic head in accordance with claim 1, wherein said prominence and said lower-core body are integral.

3. A combination read/write thin film magnetic head in accordance with claim 2, wherein said width (T1) is shorter than said width (T2) so that the width of said prominence gradually increases from its top surface toward its bottom surface.

4. A combination read/write thin film magnetic head in accordance with claim 3, wherein each of said side surfaces of said prominence extends at an angle of 60 degrees to 120 degrees with respect to a plane coplanar with said top surface of said prominence.

5. A combination read/write thin film magnetic head in accordance with claim 4, wherein the height of said prominence is not less than the thickness of said gap layer and not greater than three times the thickness of said gap layer.

6. A combination read/write thin film magnetic head in accordance with claim 5, wherein each of said slanted surfaces of said lower-core body extends at an angle of 2 degrees to 10 degrees with respect to a plane coplanar with said bottom surface of said prominence.

7. A combination read/write thin film magnetic head in accordance with claim 2, wherein each of said side surfaces of said prominence extends at an angle of 60 degrees to 120 degrees with respect to a plane coplaner with said top surface of said prominence.

8. A combination read/write thin film magnetic head in accordance with claim 7, wherein the height of said prominence is not less than the thickness of said gap layer and not greater than three times the thickness of said top gap layer.

9. A combination read/write thin film magnetic head in accordance with claim 8, wherein each of said slanted surfaces of said lower-core body extends at an angle of 2 degrees to 10 degrees with respect to a plane coplanar with said bottom surface of said prominence.

10. A combination read/write thin film magnetic head in accordance with claim 2, wherein said width (T1) is equal in length to said width (T2), and said prominence has a substantially rectangular shape.

11. A combination read/write thin film magnetic head in accordance with claim 10, wherein the height of said prominence is not less than the thickness of said gap layer and not greater than three times the thickness of said gap layer.

12. A combination read/write thin film magnetic head in accordance with claim 11, wherein each of said slanted surfaces of said lower-core body extends at an angle of 2 degrees to 10 degrees with respect to a plane coplanar with said bottom surface of said prominence.

13. A combination read/write thin film magnetic head in accordance with claim 1, wherein said lower-core body and said prominence are separate layers.

14. A combination read/write thin film magnetic head in accordance with claim 13, wherein said width (T1) is shorter than said width (T2) so that the width of said prominence gradually increases from its top surface toward its bottom surface.

15. A combination read/write thin film magnetic head in accordance with claim 14, wherein each of said side surfaces of said prominence extends at an angle of 60 degrees to 120 degrees with respect to a plane coplanar with said top surface of said prominence.

16. A combination read/write thin film magnetic head in accordance with claim 15, wherein the height of said prominence is not less than the thickness of said gap layer and not greater than three times the thickness of said gap layer.

17. A combination read/write thin film magnetic head in accordance with claim 16, wherein each of said slanted surfaces of said lower-core body extends at an angle of 2 degrees to 10 degrees with respect to a plane coplanar with said bottom surface of said prominence.

18. A combination read/write thin film magnetic head in accordance with claim 13, wherein each of said side surfaces of said prominence extends at an angle of 60 degrees to 120 degrees with respect to a plane coplanar with said top surface of said prominence.

19. A combination read/write thin film magnetic head in accordance with claim 18, wherein the height of said prominence is not less than the thickness of said gap layer and not greater than three times the thickness of said top gap layer.

20. A combination read/write thin film magnetic head in accordance with claim 19, wherein each of said slanted surfaces of said lower-core body extends at an angle of 2 degrees to 10 degrees with respect to a plane coplanar with said bottom surface of said prominence.

21. A combination read/write thin film magnetic head in accordance with claim 13, wherein said width (T1) is equal in length to said width (T2), and said prominence has a substantially rectangular shape.

22. A combination read/write thin film magnetic head in accordance with claim 21, wherein the height of said prominence is not less than the thickness of said gap layer and not greater than three times the thickness of said gap layer.

23. A combination read/write thin film magnetic head in accordance with claim 22, wherein each of said slanted surfaces of said lower-core body extends at an angle of 2 degrees to 10 degrees with respect to a plane coplanar with said bottom surface of said prominence.

24. A combination read/write thin film magnetic head in accordance with claim 1, wherein said width (T1) is shorter than said width (T2) so that the width of said prominence gradually increases from its top surface toward its bottom surface.

25. A combination read/write thin film magnetic head in accordance with claim 24, wherein each of said side surfaces of said prominence extends at an angle of 60 degrees to 120 degrees with respect to a plane coplanar with said top surface of said prominence.

26. A combination read/write thin film magnetic head in accordance with claim 25, wherein the height of said prominence is not less than the thickness of said gap layer and not greater than three times the thickness of said gap layer.

27. A combination read/write thin film magnetic head in accordance with claim 26, wherein each of said slanted surfaces of said lower-core body extends at an angle of 2 degrees to 10 degrees with respect to a plane coplanar with said bottom surface of said prominence.

28. A combination read/write thin film magnetic head in accordance with claim 24, wherein the height of said prominence is not less than the thickness of said gap layer and not greater than three times the thickness of said gap layer.

29. A combination read/write thin film magnetic head in accordance with claim 28, wherein each of said slanted surfaces of said lower-core body extends at an angle of 2 degrees to 10 degrees with respect to a plane coplanar with said bottom surface of said prominence.

30. A combination read/write thin film magnetic head in accordance with claim 24, wherein said width (T1) is equal in length to said width (T2), and said prominence has a substantially rectangular shape.

31. A combination read/write thin film magnetic head in accordance with claim 30, wherein the height of said prominence is not less than the thickness of said gap layer and not greater than three times the thickness of said gap layer.

32. A combination read/write thin film magnetic head in accordance with claim 31, wherein each of said slanted surfaces of said lower-core body extends at an angle of 2 degrees to 10 degrees with respect to said bottom surface of said prominence.

33. A combination read/write thin film magnetic head in accordance with claim 1, wherein each of said side surfaces of said prominence extends at an angle of 60 degrees to 120 degrees with respect to a plane coplanar with said top surface of said prominence.

34. A combination read/write thin film magnetic head in accordance with claim 33, wherein the height of said prominence is not less than the thickness of said gap layer and not greater than three times the thickness of said gap layer.

35. A combination read/write thin film magnetic head in accordance with claim 34, wherein each of said slanted surfaces of said lower-core body extends at an angle of 2 degrees to 10 degrees with respect to a plane coplanar with said bottom surface of said prominence.

36. A combination read/write thin film magnetic head in accordance with claim 1, wherein the height of said prominence is not less than the thickness of said gap layer and not greater than three times the thickness of said gap layer.

37. A combination read/write thin film magnetic head in accordance with claim 1, wherein each of said slanted surfaces of said lower-core body extends at an angle of 2 degrees to 10 degrees with respect to a plane coplanar with said bottom surface of said prominence.

38. A combination read/write thin film magnetic head in accordance with claim 1, wherein said width (T1) is equal in length to said width (T2), and said prominence has a substantially rectangular shape.

39. A combination read/write thin film magnetic head in accordance with claim 38, wherein the height of said prominence is not less than the thickness of said gap layer and not greater than three times the thickness of said gap layer.

40. A combination read/write thin film magnetic head in accordance with claim 39, wherein each of said slanted surfaces of said lower-core body extends at an angle of 2 degrees to 10 degrees with respect to a plane coplanar with said bottom surface of said prominence.

* * * * *

UNITED STATES PATENT AND TRADEMARK OFFICE
CERTIFICATE OF CORRECTION

PATENT NO. : 5,949,625
DATED : September 7, 1999
INVENTOR(S) : Kiyoshi Sato et al.

It is certified that error appears in the above-indentified patent and that said Letters Patent is hereby corrected as shown below:

<u>In the Claims</u>

In claim 8, line 4, delete "top".

In claim 19, line 4, delete "top".

Signed and Sealed this

Eighteenth Day of April, 2000

*Attest:*

Q. TODD DICKINSON

*Attesting Officer*     *Director of Patents and Trademarks*